Aug. 21, 1951

J. I. HELLER 2,564,973

FREQUENCY MODULATED PRINTING

Filed June 24, 1947

2 Sheets-Sheet 1

Inventor

JOSEPH I. HELLER

By Hyman Hurvitz

Attorney

Aug. 21, 1951 J. I. HELLER 2,564,973

FREQUENCY MODULATED PRINTING

Filed June 24, 1947 2 Sheets-Sheet 2

Inventor

JOSEPH I. HELLER

By Hyman Hurwitz

Attorney

Patented Aug. 21, 1951 2,564,973

UNITED STATES PATENT OFFICE 2,564,973

FREQUENCY MODULATED PRINTING

Joseph I. Heller, Brooklyn, N. Y., assignor, by mesne assignments, to Marcel Wallace, doing business as Panoramic Laboratories, East Port Chester, Conn.

Application June 24, 1947, Serial No. 756,701

17 Claims. (Cl. 346—33)

This invention relates generally to systems for transmitting intelligible data and for recording same at a remote location.

More specifically the invention presents improvements in telemetric systems of the type wherein telemetric data is transmitted in terms of the frequency of an alternating current signal, and is recorded on a facsimile type recorder in terms of lateral positions of a mark on a time fed record receiving surface.

One system of the above character to which my invention has particular application is disclosed in an application for U. S. Patent Serial No. 729,378, filed February 18, 1947 in the name of M. Wallace, and entitled Stratograph, that application being assigned to a common assignee with the present application. By virtue of the invention of the present application it is feasible to transmit in the system described in the aforementioned application of M. Wallace, Serial No. 729,378, information from each source of telemetric data, which, being recorded in the form of printed letters, insignia, or characters of any desired type, is susceptible of ready interpretation at the recorder, the said printed letters, insignia or characters being superimposed on the telemetric data otherwise transmitted.

As an example of one use or application of the present invention information concerning the identity of a telemetric transmitter may be superimposed on a telemetric record, in terms of printed letters rather than in terms of coded interruptions of a carrier. As an example of a further such use or application, the superimposed characters may themselves have telemetric significance; so, where frequency of a transmitted carrier is interpretable as altitude of an aircraft, characters superimposed on the altitude representative record may themselves be representative of bearing or range, of the transmitting aircraft. The invention is, of course, susceptible of still further uses and applications, which will readily suggest themselves to those skilled in the pertinent art.

Briefly described, I carry out my invention by applying controlled deviations of the frequency of a carrier, or deviations which occur in accordance with a predetermined law of time variation, the mean or average value of which is representative of a telemetric quantity, the deviations being controlled in respect to both timing and extent in such manner that a facsimile recorder, which is adapted and arranged to provide marks on a record receiving surface corresponding in lateral positions with received frequencies, is constrained to trace desired insignia or characters, as the transmitted frequency slowly varies, which are superimposed on the telemetric record, and serve to impart further information in conjunction therewith.

Accordingly, it is an object of the present invention to provide a system of telemetric transmission and reception, which envisages the possibility of superimposing desired insignia or characters on the telemetric record.

It is a further object of the invention to provide a system of transmitting telemetric data in terms of the average value of a transmitted carrier, further information of any desired nature being superimposed on the telemetric data in terms of deviations of the average value of the transmitted carrier.

It is still a further object of the invention to provide a telemetric system comprising a facsimile type recorder for recording values of a telemetric quantity, and for further recording characters of any desired type for conveying information supplementary to the telemetric data, the latter characters being superimposed on the telemetric record.

The above and still further features, advantages and objects of my invention will become apparent upon consideration of the following detailed description of a specific embodiment of my invention, especially when taken in conjunction with the accompanying drawings, wherein:

Figure 4 is an enlarged representation of a character transmitted in accordance with the invention, and analyzed in accordance with its constituent elements.

Figures 1, 4A, 4B:
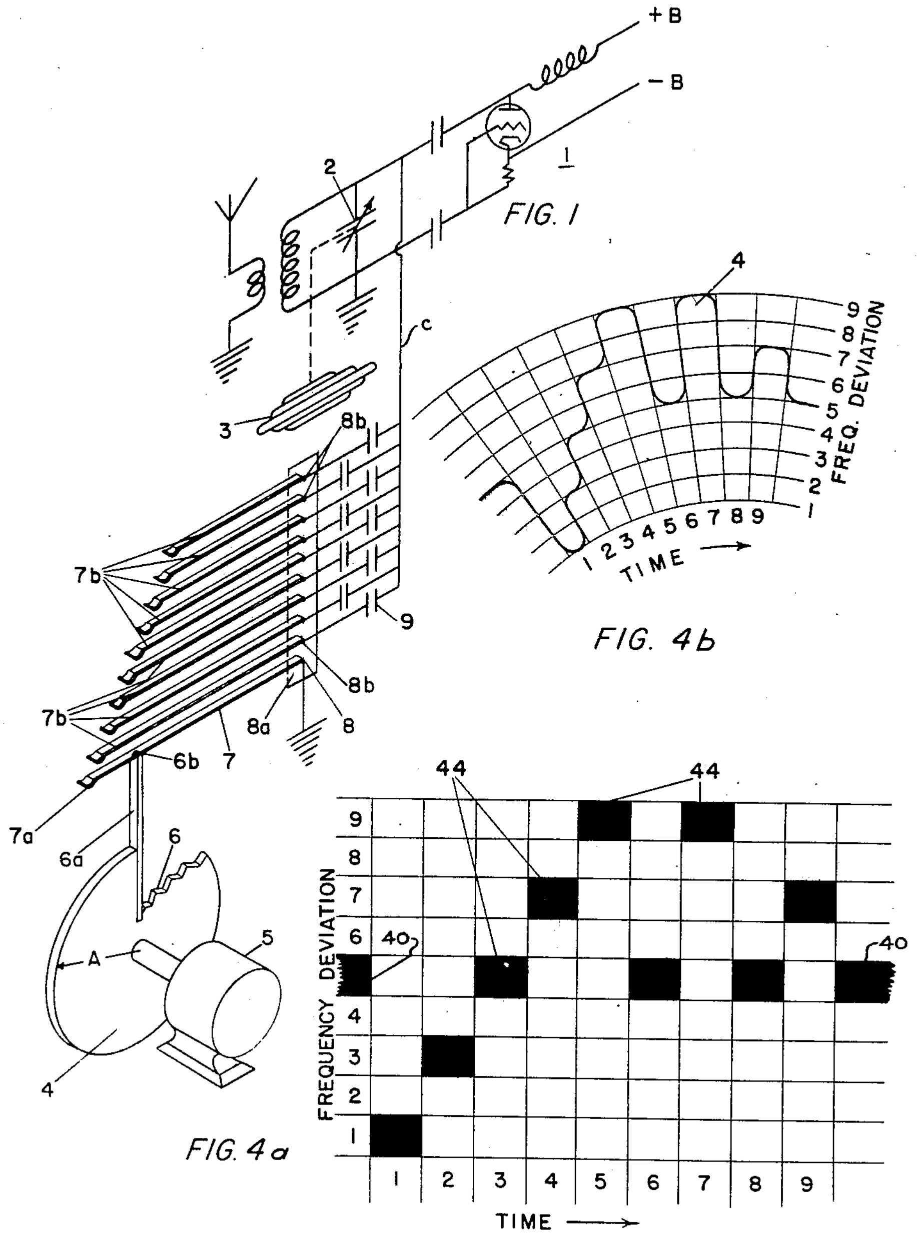
Figure 1 represents an embodiment of a telemetric transmitting station, in accordance with the invention.
Figure 4b is a plot of a cam outline required to generate the letter illustrated in Figure 4a of the drawings.

Proceeding now with a detailed description of the invention, the circuit assembly 1 represents a conventional type of tunable transmitter-oscillator which may be tunable over any selected band of frequencies, say from 148–152 mc., in response to variation of capacity enforced upon tuning condenser 2 of the oscillator. The condenser 2 may be tuned in response to mechanical motion of an aneroid cell 3, the latter motion occurring in response to variations of atmospheric pressure, as the pressure external to the cell varies from that appropriate to sea level to that appropriate to an altitude of, say, 10,000 feet. The band of frequencies selected for operation is arbitrary, as is also the range of frequencies and the corresponding range of altitudes. It will be realized, moreover, that the condenser 2 might be varied in respect to capacitance by measuring instruments other than an aneroid cell, in known manner, and hence that the transmitter-oscillator 1 might be adapted for transmissions of signals at frequencies representative broadly of any desired telemetric or measurable quantity. While I have disclosed the preferred embodiment of my invention as applied to altitude measurements, and have chosen to specify a range of altitudes and a range of corresponding frequencies, by way of example, the invention is not limited to such ranges, nor to such specific application, as will appear as the description proceeds.

It will further be realized, that while I have disclosed the oscillator 1 as directly coupled with a transmitting antenna, a buffer amplifier and/or a power amplifier may be interposed, if desired, in accordance with principles well understood in the art of radio communication, and also that the output of oscillator 1 may be heterodyned for transmission at a different value of frequency than is directly generated thereby.

For purposes of simplicity in the present exposition, the oscillator 1 is illustrated as transmitting directly, and may be considered to be mounted in an aircraft, or other elevated body, as desired, in which event the frequency of transmission will be at all times representative of the altitude of the body, and as the altitude of the body varies, so also will the frequency of transmission of the associated transmitter 1 vary.

The transmitter 1 may be caused to deviate from its mean frequency of operation as determined by its altitude, by introducing into the local oscillator circuit controlled capacity, which is connected in parallel with the main tuning capacity provided by condenser 2 and which deviates the transmitted frequency of the transmitter 1 to such extents, and at such times, as to provide at the receiver and recorder of the present system recorded indicia, superimposed on the main telemetric record. Specifically I provide a cam wheel 4 having a suitably coded periphery, and which may be rotated by a clock 5 or its equivalent, slowly. The cam wheel 4 is formed with a series of peripheral sectors, some of greater and some of lesser radius than the mean radius A of the cam, but all preferably of equal angular extents peripherally about the cam. The radius of any of the cam sectors 6 may be selected from among a predetermined number of successive values of radius, increasing and decreasing in equal steps of distance with respect to the mean radius A.

The cam wheel 4 may be provided with a cam follower *6a*, of insulating material, which is connected as by means of a rivet *6b* with a flexible spring lead 7, preferably having one end *7a* bent in the shape of a V or a U, and secured at its other end to a terminal 8 of an insulating terminal board *8a*. The terminal board *8a* is provided with a total of 9 additional terminals *8b*, that number being selected by way of example only, to each of which is secured a further spring lead *7b* being of successively shorter lengths, proceeding from the initial spring lead 7, but otherwise similar to the latter. The spacing between the various spring leads is so selected with respect to the differences of radii of the peripheral sectors 6 that as the cam follower *6a* follows the peripheral sectors 6 of cam 4, from a sector of minimum radius to a sector of maximum radius, by successive steps, the spring lead 7 contacts first none of the spring leads *7b*, and then contacts with the lowermost of leads *7b*, the latter on the next step 6 contacting with the next succeeding lead *7b* and so on until for the sector 6 of greatest radius all the leads *7b* are in contact.

By virtue of the fact that lead 7 is grounded, and that the condensers 9 are connected one in series with each of the spring leads *7b*, and thence to a common lead *c*, the condensers 9 may be connected in selective plurality in parallel across the oscillator tuning condenser 2 of the transmitter 1, and hence may be utilized for producing selected increments of deviation of the transmitted frequency which conform with the radii of the successive peripheral sectors 6 of the cam 4.

Summarizing briefly the operation of the apparatus illustrated in Figure 1 of the drawings, and which has been hereinbefore described in detail, the transmitter 1 transmits signals at a frequency bearing a definite relation to the altitude of the transmitter. The transmitter is subjected to further frequency deviations centered about the mean or altitude corresponding frequency by means of the cam operated switching arrangement comprising cam 4 and trimmer condensers 9. It will of course be realized that in the practice of the present invention a plurality of aircraft (not shown) will normally be located in the vicinity of a ground station at any particular time, and that all such aircraft being similarly equipped, will simultaneously provide transmissions of the character above described, the transmissions varying in mean frequency as the altitudes of the aircraft differ in value, and each aircraft transmitting timed deviations of a character determined by the character of the cam wheel 4 provided therefor.

Figures 2, 3:
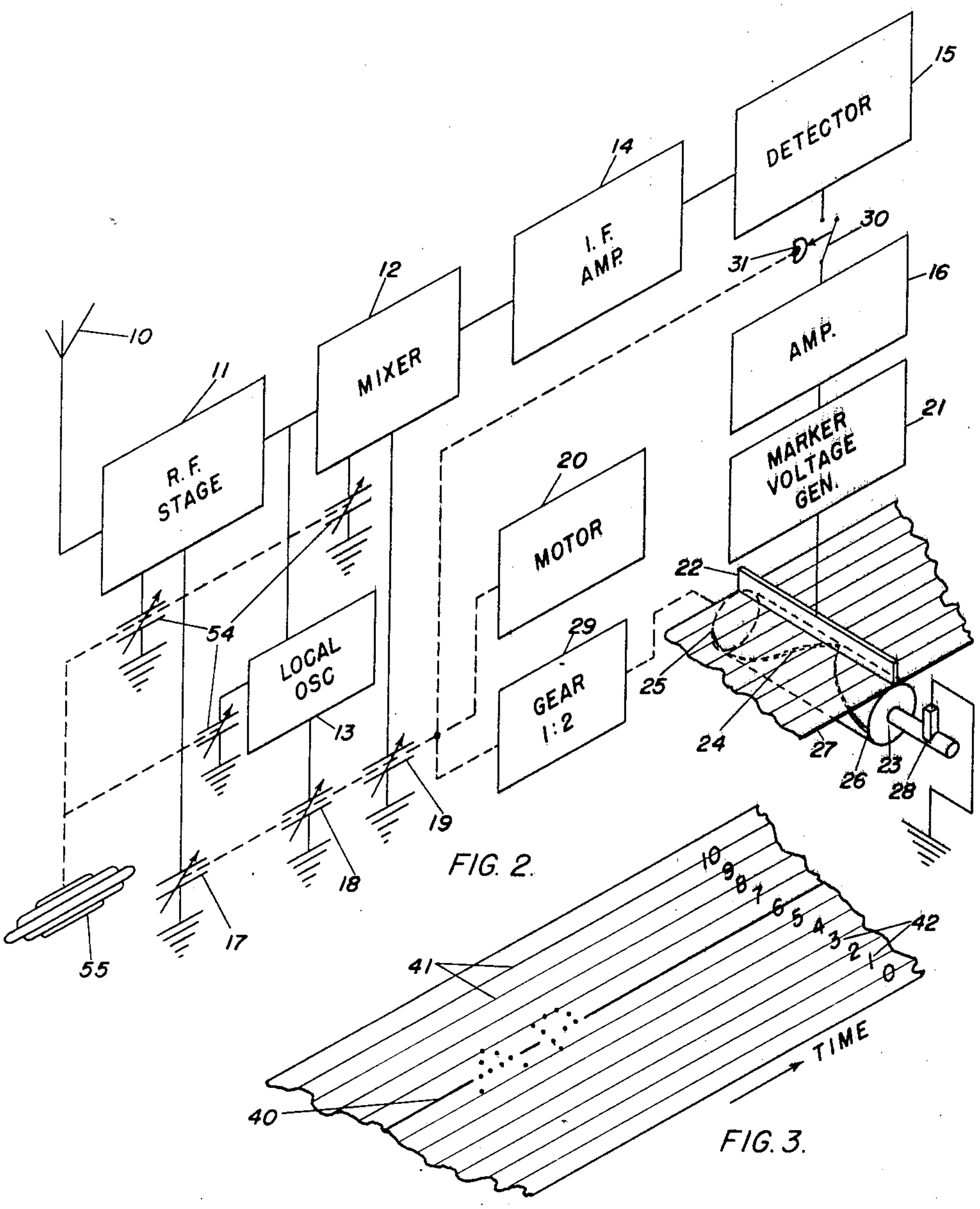
Figure 2 is a functional block diagram of a receiving and recording station in accordance with the invention.
Figure 3 is a plot of values of a telemetric quantity having indicia superimposed thereon, and indicating the character of the record provided in accordance with the present invention.

Suitable apparatus for interpreting, translating and recording transmissions from the various aircraft located adjacent a ground station, or landing field, is illustrated in Figure 2 of the drawings, the character of the record made being illustrated in Figure 3. Reference is presently made to these figures in connection with the following detailed description of a recording station arranged in accordance with the present invention.

At the ground station I utilize a frequency scanning radio receiver which scans continuously the band of frequencies allocated to altitude representation, which, in the present example, is constituted of the band 150–155 mc. The receiver itself comprises an antenna 10, an R. F. stage 11, a mixer 12 and a local oscillator 13, the outputs of the local oscillator 13 and of the R. F. stage 11 being applied to the mixer 12, wherein by reason of heterodyning action, an intermediate or difference frequency is generated, in a manner well known per se in the art involving superheterodyne receivers, the said intermediate or difference frequency being amplified in an intermediate frequency amplifier 14, the output of which is applied to an amplitude detector 15, the out put of the latter being in turn amplified by an amplifier 16. The frequency scanning action, hereinbefore referred to, is caused by varying the capacity values of tuning condensers 17, 18 and 19, associated respectively with the R. F. stage 11, mixer 12, and local oscillator 13, and which are continuously rotated, at a preferred rate of 7½ R. P. S. by means of a motor 20, causing the receiver to be responsive in succession to each frequency in its operative band, and the scanning action to be periodic and indefinitely and cyclically repeated.

Since the detector 15 is of the type suited for detecting amplitude of impressed carrier, the output of the detector 15 and of the amplifier 16 is represented primarily by a D. C. voltage, which has a magnitude dependent on the amplitude of incoming R. F. signals, being zero in the absence of such signals. The output of the amplifier 16 is utilized to control the output from a marker voltage generator 21, the output of which may be applied to a marker 22. The motor 20, in addition to driving the frequency scanning condensers 17, 18 and 19 may be utilized to drive in synchronism a cylindrical member 23, having a helical raised platen portion 24 secured thereto, which extends about the cylinder for a total of one turn, the one turn entirely encompassing the cylindrical member 23, and the pitch of the helical portion 24 being such as to provide an element of the helix for each position along the axis of the cylinder 23. The relative phasing of the motion of condensers 17, 18, 19 and the cylinder 23 is such as to cause the extremity 25 of helix 24 to be immediately adjacent to marker 22 when the receiver is tuned to its minimum frequency (148 mc.), corresponding with zero altitude, and such as to cause the extremity 26 of the helix to be immediately adjacent the marker 22 when the receiver is tuned to its maximum frequency (152 mc.) corresponding with maximum altitude (10,000 ft.).

Since the frequency characteristic of a conventional straight line-frequency variable condenser is generally of pyramidal shape, the frequency increasing linearly with rotor shaft motion for 180° and thereafter decreasing in a relatively linear fashion for the remaining 180° of rotation of the rotor shaft, while the scanning platen utilized in the preferred mode of practicing the present invention travels in only one direction, linearly with time, it follows that the platen must complete a cycle of rotation during one half cycle or 180° of operation of the condenser and while the frequency of the receiver is increasing, and that the receiver must be disabled, as by cam 31 and associated switch 30, during the remaining half cycle or 180° of rotation, while the frequency is decreasing to zero. The cam 30 is driven from the motor 20 in proper phase for the purpose, having a 180° dwell for closing the switch 30 and a further 180° dwell for opening the switch 30.

As a consequence, the condensers 17, 18 and 19 must travel at one-half the rotational velocity of the helical platen 24. To accomplish the proper relative speed between the condensers 17, 18 and 19 and the helical platen 24, the condensers may be driven directly from the motor 20, while the platen 24 is driven from the motor 20 through a speed increasing gearing 29, which provides a speed change in the ratio 1:2. The recorder energizing circuit comprising marker voltage generator 21 is disabled during the undesired half cycle of condenser rotation by means of a switch 30, which is controlled by means of a cam 31 driven from the motor 20, or by some equivalent mechanism.

A time calibrated record receiving surface 27 is maintained between the platen 22 and the cylinder 23, and in contact therewith, and is fed at some convenient rate, say 6″ per minute, by means of a clockwork mechanism (not shown). The record receiving surface 27 may be constituted of suitably chemically treated paper, of such character that passage of current therethrough will cause a mark to appear on the paper. In the present instance current is caused to flow through the paper 27 by applying voltage to the platen 22, the cylinder 23 and the helical member 24 being constructed of metal and grounded, as indicated at 28, to provide a path to ground for the record producing current. The paper 27 is maintained in conductive condition, preferably slightly moist, and is dried after recording, and is collected, by means of apparatus which is known per se, and is accordingly neither illustrated nor described herein. Voltage is applied to the marker 22 by the marker voltage generator 21, which in the present apparatus may be an amplifier having low internal impedance, and which is capable of supplying sufficient current flow to produce clear sharp markings on the paper 27.

Since the transmitter oscillator 1 is tuned primarily by means of an aneroid cell 3, which is intended to measure altitude, and since measurements of altitude by means of aneroid cells are inaccurate unless ambient atmospheric pressure is corrected for, I introduce into the tuning of the R. F. stage 11, the mixer 12 and the local oscillator 13, a tuning correction derived from an aneroid cell 55, located on the ground, the cell serving to determine capacitance values of trimmer condensers 51 associated with each of the tunable elements 11, 12 and 13. Accordingly, any modification of tuning at the transmitter 1 which is introduced solely by ambient atmospheric conditions is matched by a corresponding change in tuning at the receiver. No correction for ambient conditions is required aboard the aircraft, since the correction is introduced at the receiver. The receiver then actually measures the difference in pressure measurements as between airborne aneroid cells, as 3, and the receiver associated cell, as 55, rather than the absolute valve of the pressure measurement, as taken aboard the aircraft, variations due to ambient conditions balancing out.

While I have illustrated and described the present system in conjunction with a recorder which functions by transmitting current through chemically treated paper, and in which a helical scanning platen is employed, the present system lends itself to use with recorders of various types and operating upon various principles. For example, I may utilize a generator 21 which is capable of creating a disruptive spark or other electrical discharge from marker 22 to platen 24, through recording surface 27, in which case chemically treated paper may be unnecessary. Alternately, I may cause the marker 22 to vibrate mechanically in response to signal output from generator 21, that output being of alternating character, and of high frequency (of the order of 5000) and controlled by the output of the amplifier 16, in which case recording may be accomplished by impacting an inked ribbon or so-called "carbon-paper" against the paper 27, the latter being backed by the platen 24. Still further, I may employ recorders operating upon principles remote indeed from that upon which operates the recorder presently described and illustrated, it being required only that a record creating mechanism is caused to scan periodically, and in synchronism with a tuning operation, over a time fed or actuated record receiving surface, and is caused to record in response to reception of signals. In operation, the receiver of Figure 2, as it scans periodically through its assigned frequency spectrum, transmits a signal to the marker voltage generator 21 upon scanning through any existing signal. The I. F. amplifier 14, having a finite frequency response characteristic, passes signals during a predetermined finite sector of scan of the condensers 17, 18 and 19, resulting in a mark on the record receiving surface 27 which has extremely small but finite length laterally of the paper. The actual period during which appreciable response of the receiver to any given signal takes place in a function of the static and dynamic selectivity of the receiver as well as of the amplitude of the received signal. Accordingly, it will be clear that for signals originating remotely of the receiving station, and hence received at low amplitude, the lateral extent of recorded signal will be slight, whereas signals transmitted from positions adjacent to the receiving station will be received at considerably greater amplitude and will cause recorded signals of correspondingly greater lateral extent. Observation of the recorded signals will, accordingly, provide information not only as to precise altitudes, and of transmitter identity, but also an approximate indication of transmitter range.

In order that misleading indications of range shall not be provided, by reason of the angle of elevation of transmitters with respect to the ground station, it is essential that a receiving antenna be used which is truly omni-directional and which does not discriminate between signals arriving from different aximuthal or elevational angles. Such antennas are available in the art, and accordingly no specific preferred antenna system is illustrated or described.

Referring now to Figure 3 of the drawings, there is illustrated a record, such as is provided by apparatus arranged in accordance with the invention, and applying to a single aircraft. The relatively heavy line 40 represents an aircraft flying at an altitude of 6000 ft., as read against the calibration lines 41, each of which corresponds with a frequency which represents a multiple of 1000 ft. of altitude, in accordance with the indicia 42. The indicia AP are each formed of a series of 9 dots, properly displaced one from another both laterally and longitudinally of the record receiving surface, and are formed in response to frequency deviations of the transmitted carrier caused by the cam 4, Figure 1.

Referring now to Figure 4*a* of the drawings, there is exemplified a letter of the alphabet, P, as recorded by the system of my invention, considerably enlarged to present clearly its structural characteristics. It will be noted that the letter is transmitted in terms of nine distinct deviations of a mean value of a carrier, the latter being represented by the solid line 40, and that the letter is made up of nine distinct markings 44. While nine distinct frequency deviations have been utilized, less than that number might be utilized by providing less than nine levels or distinct steps on the cam 4, a section of the periphery of which is represented in Figure 4*b*. Alternatively more such deviations may be provided by extending the numbers of trimmers 9, and associated contacts 7*b* (Figure 1), and providing additional and correspondingly stepped peripheral sectors on the cam 4.

The number of discrete markings to be utilized in creating any given letter of the alphabet, on the other hand, depends not at all on the number of trimmer condensers 9 which are utilized in the system, but depends entirely on the design of the cam. I have arbitrarily selected nine such markings to represent the letter P.

Likewise the units of frequency deviation utilized in the system involve a matter of choice only, and a greater or a lesser deviation may be utilized in accordance with the desired height of the indicia; still further the lateral extends or widths of the indicia depend upon the relative speed of travel of the clock 5 and of the record receiving surface at the recorder, and hence are readily controllable.

The time divisions of the plot of Figure 4*a* are correspondingly numbered with like time divisions about the cam periphery, the frequency position of each of the elements 44 corresponding with a radial position of a cam sector, and the corresponding frequency positions or deviations of the recorded character and of the cam outline being identified in Figures 4*a* and 4*b*, respectively, by corresponding numerals. The position 5 is the normal position of the cam, about which deviations take place, whence the position 5 in Figure 4*a* represents a value of altitude, in the present application and embodiment of the invention. During normal altitude transmissions, then, while no indicia are being transmitted the cam 4 is arranged to maintain five of trimmer condensers 9 in circuit, adding and subtracting condensers as required for transmission of the indicia, to effect slight incremental increases or decreases of mean frequency.

The outline of the cam 4 as illustrated in Figure 4 of the drawings need not correspond precisely with the actual outline of a working cam. By reason of the perpendicular sides of the cam sectors, as illustrated, some difficulty may be encountered by the follower 6 in following the cam outline, and this will, in turn, introduce irregularities in the recorded indicia. In actual practice therefore the outlines of the cam sectors may be rounded very considerably to effect a smooth transition from one cam level to another. The effect of this expedient is to introduce slight spaces along the time axis between the various elements of the indicia, so that an actual recorded indicia departs slightly in character from the illustration of Figure 4*a*, the lateral being to an extent idealized in this respect.

While I have illustrated my invention as applied to the transmission of letters of the alphabet it will be clear that indicia of any desired character may be transmitted, by utilizing appropriate cam configurations.

Further, while I have disclosed my invention as applied to the recording system of Figure 2 of application for Patent Serial No. 729,378, filed February 18, 1947, it will be clear that any of the various species of recorder described and illustrated in that application may be utilized in the practice of my invention, the specific recorder utilized involving merely a matter of choice.

While I have illustrated and described one specific embodiment of my invention, various modifications of the general arrangement and of details of construction may be resorted to without departing from the spirit and scope of the invention as defined in the appended claims.

What I claim and desire to secure by Letters Patent of the United States is:

1. A telemetric system comprising a transmitter, tunable means for tuning said transmitter to transmit a carrier signal at a frequency representative of a value of a measurable quantity, recorder means for recording values of said measurable quantity in response to the frequency of said signal, and means for controllably deviating the tuning of said transmitter with respect to said frequency in accordance with a predetermined law of time variation representative of a printed character.

2. In a telemetric system having a tunable transmitter, a measuring device, means responsive to said measuring device for controlling the tuning of said transmitter to provide transmission at a first carrier frequency dependent upon the value of a measurable quantity as determined by said measuring device, a periodically frequency scanning receiver, a periodically line scanning recorder for scanning a record receiving surface of said recorder, means for synchronizing said space scanning with said frequency scanning, and means responsive to receipt of a signal by said receiver for causing said recorder to create a mark on said record receiving surface, the combination of means for further deviating the frequency of said transmitter from said first frequency in accordance with a time law of variation of frequency such as to provide recorded characters on said record receiving surface.

3. A system for transmitting characters comprising a tunable transmitter, a recorder having a periodically space scanning recording mechanism, a periodically frequency scanning receiver for receiving signals from said tunable transmitter and scanning in synchronism with the scanning of said recording mechanism, and means for deviating the frequency of said transmitter in accordance with a predetermined law of frequency variation with time, representative of a printed character, said recorder comprising means operative when said signals are received by said frequency scanning receiver during frequency scanning thereof for making a record representative of said carrier and of the deviations thereof, to reproduce said printed character.

4. A system for transmitting printed characters comprising a tunable transmitter tunable over a predetermined band of frequencies, a periodically line scanning facsimile recorder, a periodically frequency scanning receiver scanning periodically said predetermined band of frequencies, means for synchronizing the line scanning of said recorder with the frequency scanning of said receiver, means responsive to signal output from said receiver for actuating said recorder to make a mark, and means for varying the tuning of said transmitter in accordance with a predetermined time law of frequency variation representative of a printed character.

5. A system in accordance with claim 4 wherein said recorder comprises a time fed record receiving surface and a laterally scanning recording member, and wherein said frequency scanning receiver comprises a tuning means, means for synchronizing operations of said tuning means and of said recording member to provide correspondence between frequencies of received signals and lateral positions of said recording member, and means for varying the tuning of said transmitter in accordance with a predetermined law of time variation representative of a printed character.

6. In combination, a transmitter for transmitting signals to a remote receiver-indicator, said signals having an information bearing characteristic representing values of a measurable quantity, means at said receiver-indicator for translating said information bearing characteristic of said signals into visible indications of values of said quantity, means at said transmitter for modifying said information bearing characteristic of said signals in accordance with the content of auxiliary visually significant information, and means at said receiver for translating modifications of said information bearing characteristic of said signals into modifications of the visible indications corresponding with the content of said auxiliary information.

7. In combination, a plurality of space separated transmitters for transmitting information to a receiver-indicator common to said plurality of transmitters, means for controlling each of said transmitters to transmit signals having a characteristic identifiable in terms of the value of a measurable quantity, means for superimposing on said signals at each of said plurality of transmitters modifications of said characteristic determined in accordance with the space pattern of the elemental portions of a predetermined symbol, said receiver indicator comprising means for interpreting said characteristic of said signals in terms of visible indications of said values and reconstructions of said predetermined symbols.

8. In combination, a transmitter for transmitting signals to a remote receiver, means for varying a characteristic of said signals in accordance with the value of a quantity, means for further varying said characteristic of said signals in accordance with the space pattern of a symbol, and means associated with said receiver for translating said signals into an indication of values of said quantity superimposed on the space pattern of said symbol.

9. In combination, a signal transmitter, means for tuning said transmitter to transmit a carrier having a frequency in accordance with values of a measurable quantity, means for modifying said tuning further in accordance with the space pattern of a symbol to provide frequency deviations of said carrier representative of said symbol, means for receiving signals provided by said transmitter and translating said frequencies of said signals into a time record of values of said quantity and an associated reconstruction of the space pattern of said symbol.

10. In combination, a transmitter, means for tuning said transmitter to transmit a carrier within a band of frequencies continuously in accordance with values of a measurable quantity, means for modifying said tuning further in accordance with a tuning pattern determined by the space pattern of a symbol, means comprising a frequency scanning receiver scanning periodically over said band of frequencies for receiving signals provided by said transmitter and for translating said received signals into a plot against a time axis of values of said quantity and an associated reconstruction of the space pattern of said symbol.

11. In combination, a signal transmitter, means for modulating a characteristic of said signal in accordance with a first law of time variation of said characteristic, said first law corresponding with the time variations of a measurable quantity, means for further modulating a characteristic of said signal in accordance with a timing pattern of a symbol, means for receiving said signals and for translating same into a plot against time of values of said measurable quantity and an associated reconstruction of the space pattern of said symbol.

12. In combination, a signal transmitter for transmitting signals to a remote receiver, said signals having a carrier frequency representative of a magnitude of physical quantity, said signals when received by said receiver being translatable into visual indications of the magnitude of said physical quantity, and means for modulating said transmitter for imposing on said signals transmitted thereby carrier frequency variations determined by the spatial configuration of a symbol, said receiver being adapted and arranged for translating said characteristics of said signals into a visual facsimile of said symbol located in juxtaposition to said visual indications of the said magnitude of said physical quantity.

13. In a system for transmitting telemetric information and superposed printed characters, a transmitter, measuring means for measuring the magnitude of a quantity, means responsive to said measuring means for tuning said transmitter to transmit a carrier having a frequency representative of said quantity, an auxiliary tuning means for said transmitter for varying the frequency of said carrier with respect to said first mentioned frequency, and means for controlling said auxiliary tuning means in accordance with a predetermined time pattern representative of said printed characters.

14. The combination in accordance with claim 13 wherein is further provided a receiver for receiving said carrier and detecting the frequency thereof, and means for recording the variations of said frequency against a time base.

15. In a system for transmitting signals representative of printed characters superposed on telemetric information, a transmitter for transmitting a carrier, measuring means for measuring the magnitude of a quantity, means for controlling the frequency of said carrier within a predetermined frequency spectrum in response to said measuring means to a value corresponding with said magnitude, and means for varying the frequency of said carrier from said value in accordance with a time pattern representative of said printed characters.

16. The combination in accordance with claim 15 wherein is further provided a frequency scanning receiver for receiving said carrier, said frequency scanning receiver scanning said predetermined spectrum periodically, a periodically line scanning recorder having a time fed record receiving surface and a line scanning marker scanning periodically across said surface, and means for actuating said marker for creating a mark on said surface in response to detection of said carrier by said frequency scanning receiver.

17. In a system for transmitting signals representative of printed carriers superposed on telemetric information, a measuring device for measuring the magnitude of a physical quantity, a primary tuning means for said transmitter, means responsive to said measuring device for setting said primary tuning means to effect generation by said transmitter of a carrier having a frequency representative of said magnitude, an auxiliary tuning means for said transmitter for varying said frequency, a mechanically actuated control for said auxiliary tuning means, said mechanically actuated control constructed and arranged for varying said auxiliary tuning means for varying said frequency in accordance with a time pattern representative of said printed matter.

JOSEPH I. HELLER.

REFERENCES CITED

The following references are of record in the file of this patent:

UNITED STATES PATENTS

| Number | Name | Date |
|---|---|---|
| 1,917,995 | Polin | July 11, 1933 |
| 1,929,241 | Franklin | Oct. 3, 1933 |
| 1,985,654 | Finch | Dec. 25, 1934 |
| 2,157,122 | Dunmore | May 9, 1939 |
| 2,173,741 | Wise et al. | Sept. 19, 1939 |
| 2,210,903 | Dunmore | Aug. 13, 1940 |
| 2,466,803 | Giffen | Apr. 12, 1949 |
| 2,469,213 | Shea | May 3, 1949 |